(12) United States Patent
Chang

(10) Patent No.: US 6,661,199 B2
(45) Date of Patent: Dec. 9, 2003

(54) POWER CONVERTERS AND RELATED CHARGING SYSTEMS

(75) Inventor: Tsung-Jen Chang, Taipei (TW)

(73) Assignee: Primax Electronics Ltd., Neihu (TW)

( * ) Notice: Subject to any disclaimer, the term of this patent is extended or adjusted under 35 U.S.C. 154(b) by 119 days.

(21) Appl. No.: 09/683,731

(22) Filed: Feb. 7, 2002

(65) Prior Publication Data

US 2003/0042867 A1 Mar. 6, 2003

(30) Foreign Application Priority Data

Aug. 30, 2001 (TW) .................................. 90121528 A

(51) Int. Cl.[7] .................................................. H02J 7/00
(52) U.S. Cl. ...................................... 320/128; 320/127
(58) Field of Search ............................... 320/128, 127, 320/124, 132, 137; 323/265, 266, 268

(56) References Cited

U.S. PATENT DOCUMENTS 5,734,254 A * 3/1998 Stephens .................... 320/106
6,087,815 A * 7/2000 Pfeifer et al. ............... 323/282

* cited by examiner

Primary Examiner—Adolf D. Berhane
Assistant Examiner—Lawrence Luk
(74) Attorney, Agent, or Firm—Winston Hsu

(57) ABSTRACT

A power charge system is provided for charging a plurality of portable electric devices. Each portable electric device has a charging port for receiving an operating voltage of the portable device. The power charge system includes a plurality of transformers for converting a plurality of different input voltages into a direct current (DC) standard voltage, and a plurality of converters for converting the standard voltage into the operating voltage of the plurality of portable electric devices. When a portable electric device needs to be charged, a converter corresponding to the portable electric device is capable of being electrically connected to any one of the transformers to receive the standard voltage from the transformer so as to charge the portable electric device.

12 Claims, 4 Drawing Sheets

POWER CONVERTERS AND RELATED CHARGING SYSTEMS

BACKGROUND OF INVENTION

1. Field of the Invention

The present invention relates to a power charge system used in a portable electric device. More specifically, the present invention discloses a power charge system for flexibly charging a portable electric device using a module design of combination of transforms and converts.

2. Description of the Prior Art

In recent years, portable electric devices such as mobile phones, personal data assistants (PDA), Walkmans, digital versatile disc players, hand-held computers, and notebooks have grown in popularity due to their convenience and practicality.

Portable electric devices have batteries for providing wanted electric power when the portable electric devices operate. When the electric power of a battery is exhausted, the battery needs to be charged so as to maintain effective operation of the portable electric device. Please refer to FIG. 1. FIG. 1 is a diagram of a power charging system of a portable electric device according to the prior art. As shown in FIG. 1, a portable electric device 10A comprises a charge port 12A for receiving a direct current (DC) operating voltage of the portable electric device 10A, and transformers 16A and 18A corresponding to the charge port 12A for charging the portable electric device 10A. The transformer 16A has an input port 17A for receiving an alternating current (AC) voltage from an AC power supply 20. The transformer 16A converts the AC voltage into the operating voltage of the portable electric device 10A and outputs the operating voltage to the portable electric device 10A through an output port 14A. The transformer 18A has an input port 19A for receiving a direct current (DC) voltage from a DC power supply 22. The transformer 18A converts the DC voltage into the operating voltage of the portable electric device 10A and outputs the operating voltage to the portable electric device 10A through an output port 15A. When the portable electric device 10A needs be charged, the transformer 16A or 18A is chosen to electrically connect with its corresponding power supply through the input port 17A or 19A, and the output port 14A or 15A of the transformer 16A or 18A is electrically connected to the charge port 12A. Therefore, the corresponding transformer 16A or 18A converts the voltage of the power supply 20 or 22 into the operating voltage of the portable electric device 10A and outputs the operating voltage to the portable electric device 10A through the charge port 12A so as to charge the portable electric device 10A.

According to the same prior art, a portable electric device 10B also comprises a charge port 12B for receiving an operating voltage of the portable electric device 10B, and transformers 16B and 18B corresponding to the charge port 12B for charging the portable electric device 10B. The transformer 16B has an input port 17B for receiving the AC voltage from the AC power supply 20. The transformer 16B converts the AC voltage into the operating voltage of the portable electric device 10B and outputs the operating voltage to the portable electric device 10B through an output port 14B. The transformer 18B has an input port 19B for receiving the DC voltage from a DC power supply 22. The transformer 18B converts the DC voltage into the operating voltage of the portable electric device 10B and outputs the operating voltage to the portable electric device 10B through an output port 15B.

Different portable electric devices have different operating voltages usually ranging from 3 volts to 12 volts. The charge port of each different portable electric device has different shapes and structures for receiving electric power. Therefore, for the prior art power charge system, the portable electric device must have a specific transformer for converting the received voltage from a power supply into the operating voltage of the portable electric device. Furthermore, the output port of the transformer must match up with the charge port of the portable electric device. When a user carries two or more portable electric devices, the user must carry the specific transformer of each portable electric device for charging each portable electric device. Although the transformers 16A and 16B are both capable of transforming the AC voltage generated from the AC power supply 20, the voltages after transforming and outputting through the corresponding output ports 14A and 14B are the specific operating voltages of the portable electric devices 10A and 10B. Likewise, the shapes of the output ports 14A and 14B of the transformers 16A and 16B are different for matching up with the corresponding charge ports 12A and 12B of the portable electric devices 10A and 10B. For the above-mentioned reasons, the transformer 16A cannot charge the portable electric device 10B, and the transformer 16B also cannot charge the portable electric device 10A.

On the other hand, if a user wants to charge one portable electric device with two different power supplies, the user must carry the different transformers to the portable electric device for transforming the voltages generated from the different power supplies into the operating voltage of the portable electric device. As shown in FIG. 1, if the user wants to charge the portable electric device 10A with the DC power supply 22 and the AC power supply 20, the user must carry the corresponding transformers 16A and 18A.

SUMMARY OF INVENTION

It is therefore a primary objective of the claimed invention to provide a power charge system with converters for charging different portable electric devices through a transformer using the same power supply so as to solve the above-mentioned problems.

The claimed invention discloses a power charge system for charging a plurality of portable electric devices. Each portable electric device has a charging port for receiving an operating voltage of the portable device. The power charge system comprises a plurality of transformers for converting a plurality of different input voltages into a direct current (DC) standard voltage, and a plurality of converters for converting the standard voltage into the operating voltage of the plurality of portable electric devices. When a portable electric device needs to be charged, a converter corresponding to the portable electric device is capable of being electrically connected to any one of the transformers to receive the standard voltage from the transformer so as to charge the portable electric device.

It is an advantage of the claimed invention that a user can arbitrarily choose different power supplies for charging different portable electric devices, since the different power supplies only need match up with a corresponding transformer, and the different portable electric devices only need match up with a corresponding converter.

These and other objectives and advantages of the present invention will no doubt become obvious to those of ordinary skill in the art after reading the following detailed description of the preferred embodiment that is illustrated in the various figures and drawings.

DETAILED DESCRIPTION

Figure 1:
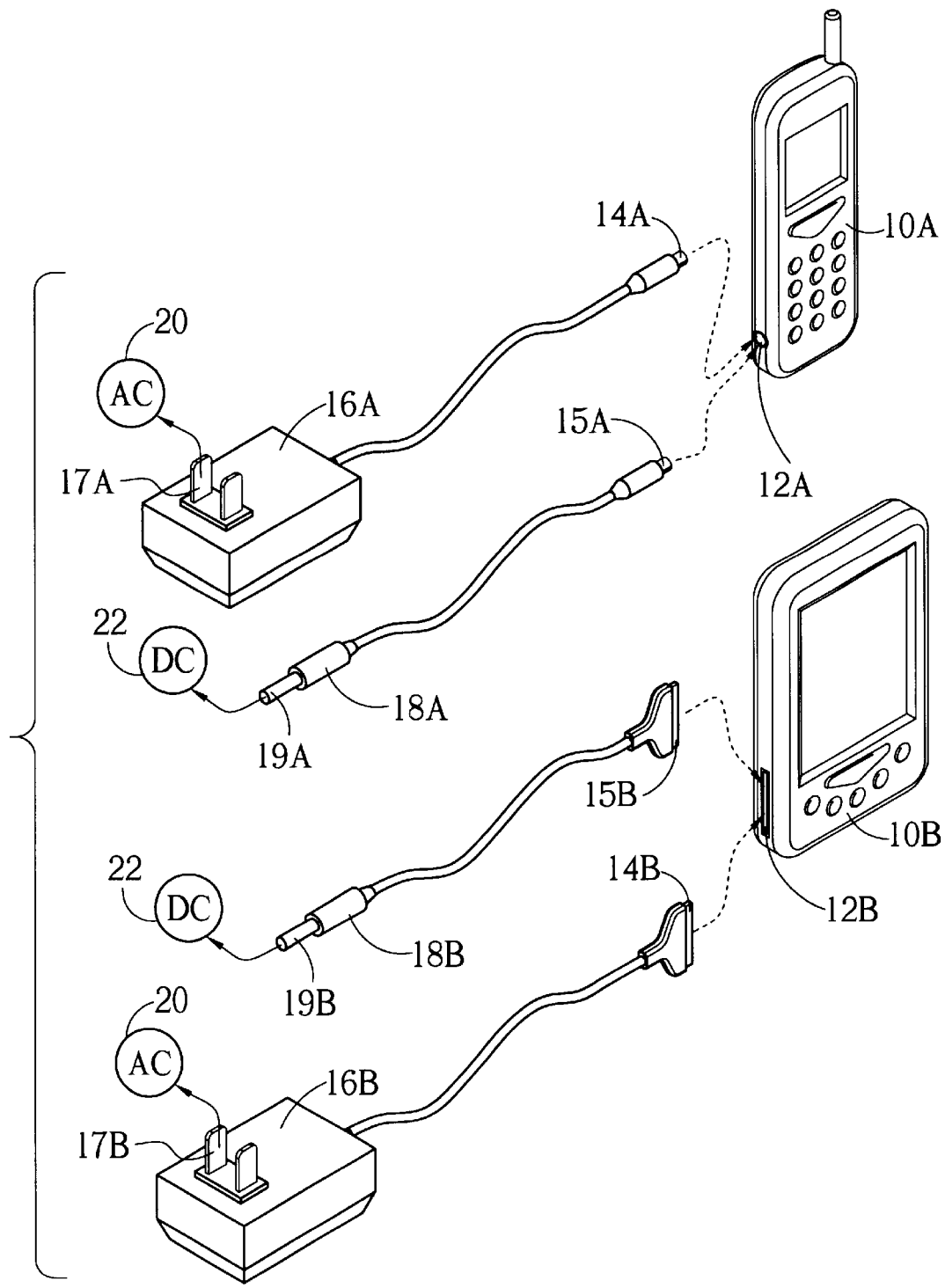
FIG. 1 is a diagram of a power charge system of a portable electric device according to the prior art.
Figure 2:
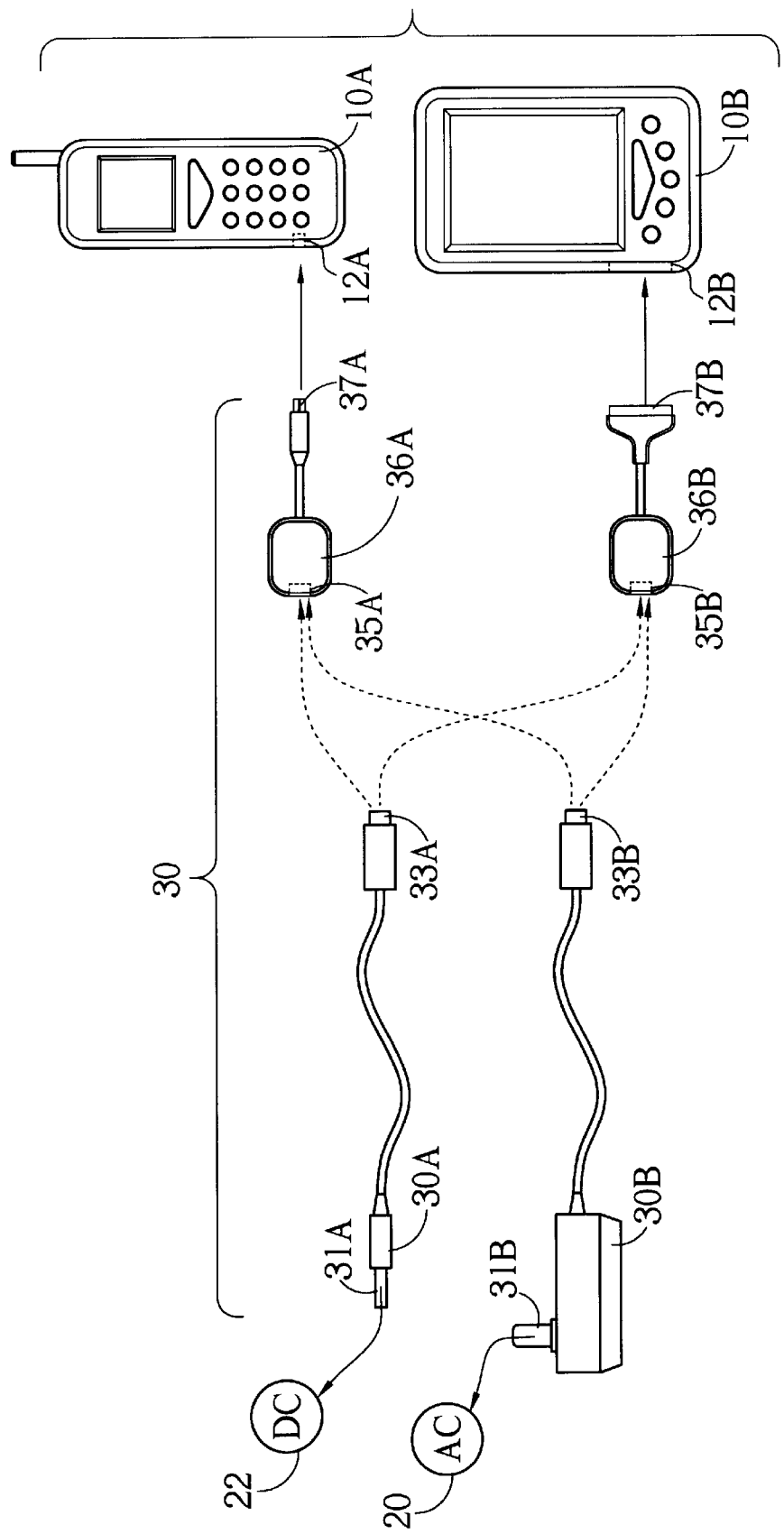
FIG. 2 is a diagram of a power charge system of a portable electric device according to the present invention.

Please refer to FIG. 2. FIG. 2 is a diagram of a power charge system 30 of portable electric devices 10A and 10B according to the present invention. The power charge system 30 comprises two transformers 30A, 30B matching up with different power supplies, and two converters 36A, 36B matching up with different portable electric devices. The portable electric devices 10A and 10B respectively have exclusive charge ports 12A and 12B for receiving DC operating voltages of each portable electric device. As shown in FIG. 2, the present invention power charge system only uses two kinds of power supplies 20, 22 to charge two different portable electric devices 10A, 10B. Clearly, the spirit of the present invention is that a plurality of different portable electric devices can be charged by a plurality of different power supplies.

Each transformer, being in accordance with each power supply, comprises an input port and an output port. The input port of the transformer is used to receive electric power of the power supply. The transformer converts electric power into a DC standard voltage and outputs the standard voltage through the output port. Even though the different transformers receive power from different power supplies, the electric power outputting from the output port of each transformer has a uniform standard, and shapes and standards of the output ports of the different transformers are also uniform. In the preferred embodiment depicted in FIG. 2, the transformer 30A receives a DC voltage from the DC power supply 22 through an input port 31A. The transformer 30A converts the DC voltage into a DC standard voltage and outputs the standard voltage through an output port 33A. The transformer 30B receives an AC voltage from the AC power supply 20 through an input port 31B. The transformer 30B also converts the AC voltage into the DC standard voltage and outputs the standard voltage through an output port 33B. The input ports of each transformer will be different so as to match up with the corresponding power supplies. Shape standards of the output ports of each transformer are uniform, and electric power outputted from each transformer is the DC standard voltage.

To match up with a plurality of different portable electric devices having different standards of the charge port, the present invention comprises a plurality of converters having an input port and an output port for matching up with each portable electric device. The shape of the input port of the converter matches up with the uniform standard of the output port of the transformer for receiving the DC standard voltage outputted from the transformer. The converter converts the standard voltage into the operating voltage of the corresponding portable electric device and outputs the operating voltage through the output port. The shape of the output port of the converter also matches up with the charge port of the corresponding portable electric device for inputting the corresponding operating voltage of the portable electric device into the charge port so as to charge the portable electric device.

As shown in FIG. 2, the converter 36A matches up with the portable electric device 10A, so an output port 37A of the converter 36A conforms to the standard of the corresponding charge port 12A, and the electric power outputted from the converter 36A is the DC operating voltage exclusive to the portable electric device 10A. On the other hand, the shape standard of an input port 35A of the converter 36A matches up with the uniform standard of the output ports 33A, 33B of the converters 30A, 30B. After receiving the uniform standard voltage from the transformer 30A or 30B, the converter 36A converts the standard voltage into the exclusive operating voltage of the portable electric device 10A and outputs the DC operating voltage through the output port 37A of the converter 36A. In addition, the converter 36B disposed in accordance with the portable electric device 10B has an input port 35B matching up with the uniform standard of the output ports of each transformer for receiving the DC standard voltage outputted from each transformer. After receiving the uniform standard voltage from the transformer 30A or 30B, the converter 36B converts the standard voltage into the exclusive operating voltage of the portable electric device 10B and outputs the DC operating voltage through the output port 37B of the converter 36B. The shape standard of the output port 37B of the converter 36B can match up with the charge port 12B of the portable electric device 10B for inputting the DC operating voltage into the charge port 12B so as to charge the portable electric device 10B.

The present invention transformers and converters are all removable. The operating situation of the power charge system 30 can be described as follows. If a user wishes to charge portable electric devices with the AC power supply 20, the input port 31B of the corresponding converter 30B can be electrically connected to the AC power supply 20. If the user wishes to charge the portable electric device 10A, the input port 35A of the corresponding converter 36A is electrically connected to the output port 33B of the transformer 30B, and the output port 37A of the converter 36A is electrically connected to the charge port 12A of the portable electric device 10A. Therefore, the transformer 30B transforms the electric power of the AC power supply 20 into the DC standard voltage, and the converter 36A converts the standard voltage into the exclusive operating voltage of the portable electric device 10A so as to charge the portable electric device 10A. If a user wishes to charge portable electric device 10B with the AC power supply 20, the input port 35B of the converter 36B is electrically connected to the output port 33B of the transformer 30B, and the output port 37B of the converter 36B is electrically connected to the charge port 12B of the portable electric device 10B. Therefore, the transformer 30B transforms the electric power of the AC power supply 20 into the DC standard voltage, and the converter 36B converts the standard voltage into the exclusive operating voltage of the portable electric device 10B so as to charge the portable electric device 10B.

On the other hand, if the user wishes to charge portable electric devices with the DC power supply 22, the input port 31A of the converter 30A is electrically connected to the DC power supply 22. The standards of the input ports of each present invention converter all match up with the uniform standard of the output ports of each transformer. As a result, the converters 36A, 36B can connect to the output port 33A of the transformer 30A through the input ports 35A, 35B for receiving the DC standard voltage outputted from the transformer 30A and converted into the operating voltage of the corresponding portable electric device.

The characteristic of this invention is that each transformer, corresponding to each different power supply with different electric power, converts the different electric power into the DC standard voltage. Next, each converter converts the standard voltage into exclusive operating voltages of the corresponding portable electric devices. The output ports of each transformer and the input ports of each converter are mutually in accordance with the uniform standard, so the output ports of each transformer can be arbitrarily connected to any one of the input ports of the converters. Additionally, for the same power supplies, the present invention needs only one transformer to convert the electric power of the power supplies into the DC standard voltage so as to charge each kind of the portable electric devices through the converters. Furthermore, for the same portable electric devices, the present invention needs only one corresponding converter to receive the DC standard voltage generated from the different transformers and the different power supplies so as to charge the portable electric devices.

Figure 3:
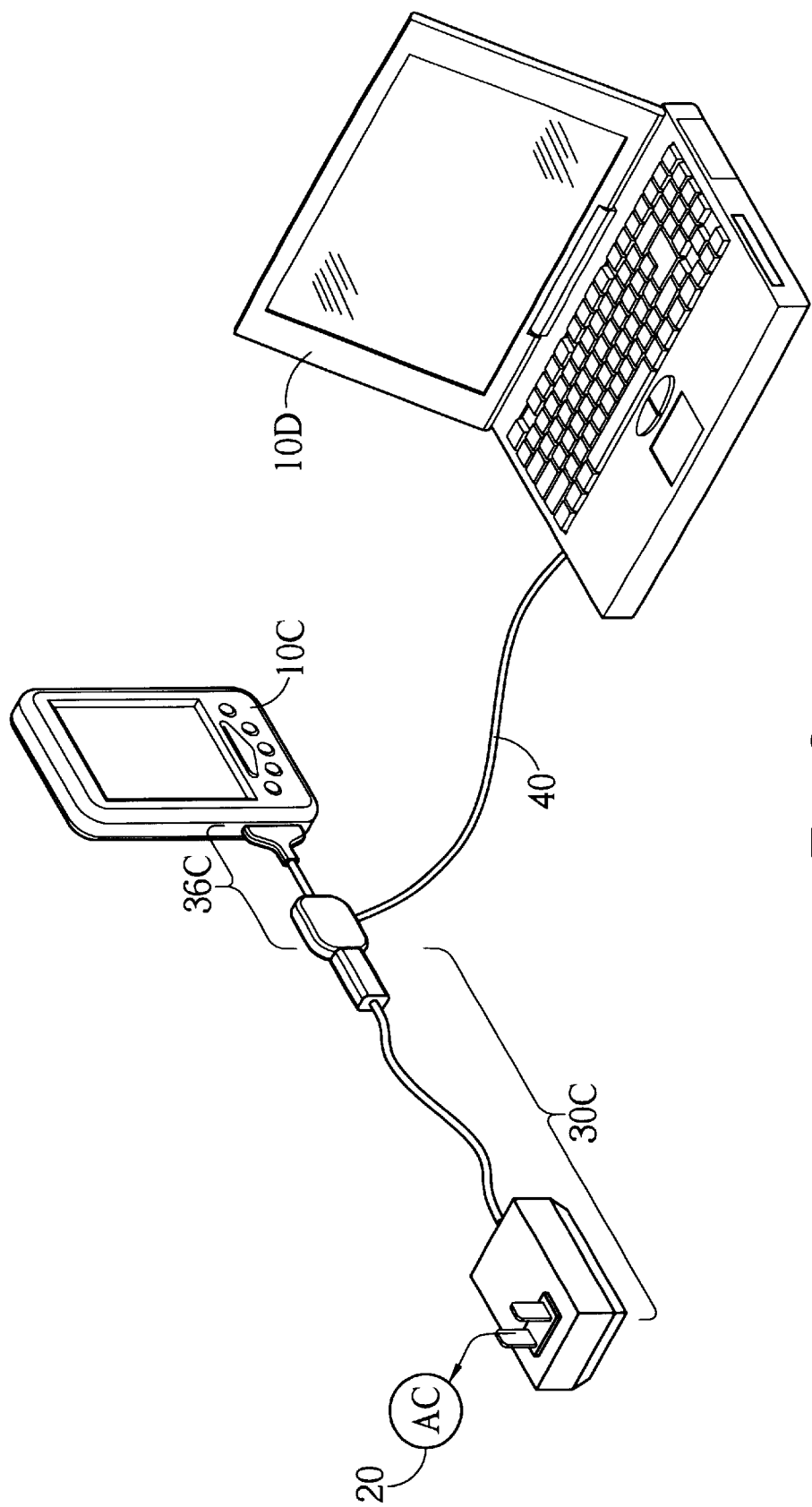
FIG. 3 is a diagram of another preferred embodiment of a power charge system of portable electric device according to the present invention.

Please refer to FIG. 3. FIG. 3 is a diagram of another preferred embodiment of a power charge system of a portable electric device according to the present invention. When the portable electric device is charged, the present invention converter has a data transmitting function for interchanging information between the portable electric device and a data processor. As with the prior preferred embodiment, a transformer 30C is used to transform the electric power of the AC power supply 20 into the DC standard voltage, and a converter 36C is used to transform the standard voltage into the exclusive operating voltage of the portable electric device 10C. The converter 36C further comprises a bus 40 connected to a data processor 10D (such as a notebook). When the AC power supply 20 charges the portable electric device 10C through the transformer 30C and the converter 36C, the portable electric device 10C can interchange information with the data processor 10D through the converter 36C and the bus 40.

Figure 4:
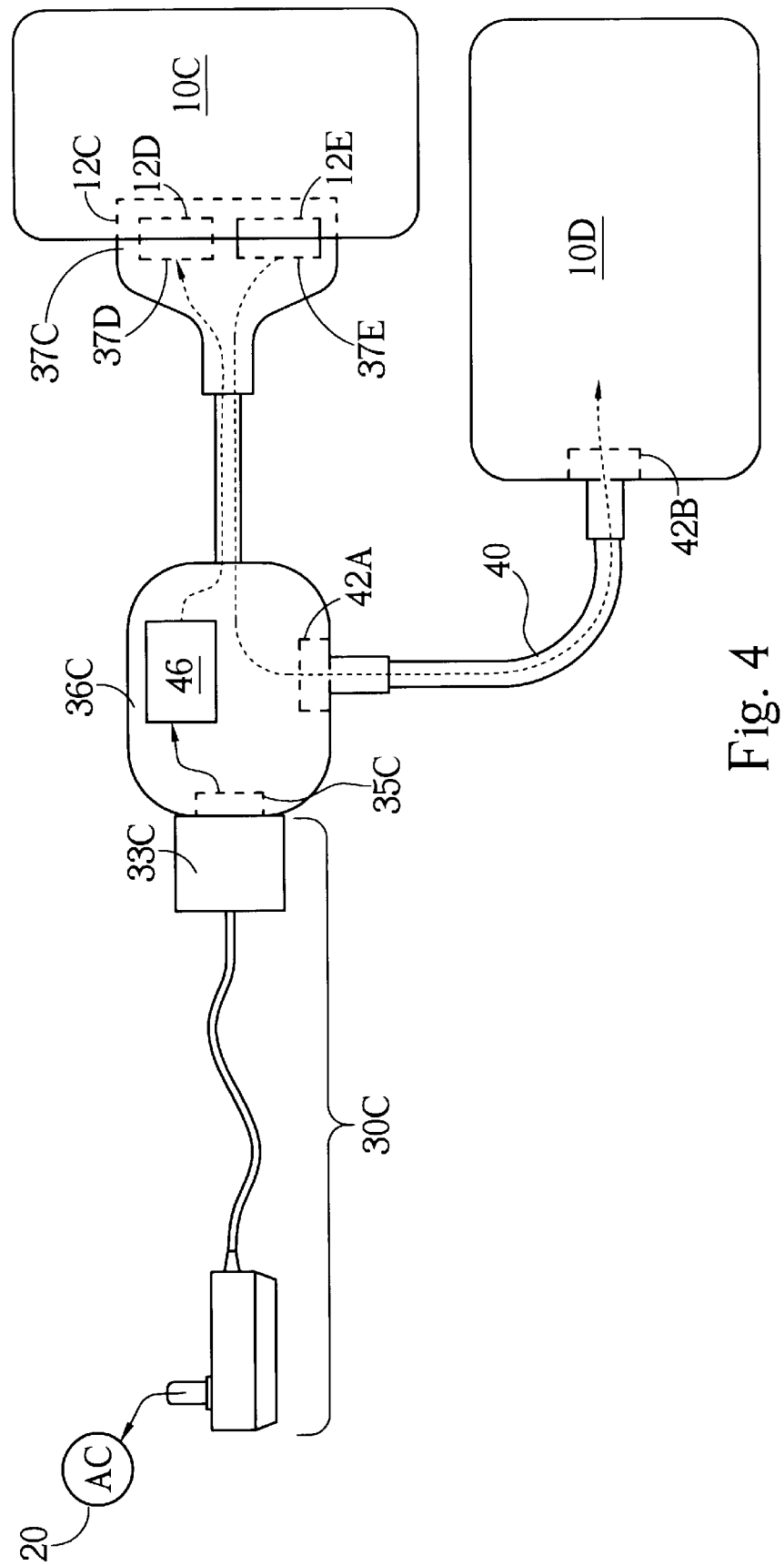
FIG. 4 is a functional block diagram of the power charge system depicted in FIG. 3.

Please refer to FIG. 4. FIG. 4 is a functional block diagram of a power charge system depicted in FIG. 3. The portable electric device 10C comprises a charge port 12C having a power port 12D for receiving electric power and a data port 12E for transmitting data. An output port 37C of the corresponding converter 36C correspondingly comprises a power port 37D for outputting electric power and a data port 37E for transmitting data. The converter 36C further comprises transforming circuitry 46 for transforming the standard voltage into the exclusive operating voltage of the portable electric device 10C, and a transmission port 42A electrically connected to a transmission port 42B of the data processor 10D through the bus 40 for transmitting data. The operating situation of this preferred embodiment can be described as follows. The transformer 30C transforms the electric power generated from the AC power supply 20 into the DC standard voltage and transmits the standard voltage to the transforming circuitry 46 through an output port 33C of the transformer 30C and an input port 35C of the converter 36C. After transforming the standard voltage into the exclusive operating voltage of the portable electric device 10C, the transforming circuitry 46 outputs the operating voltage to the power port 12D of the portable electric device 10C through the power port 37D of the converter 36C so as to charge the portable electric device 10C. When the output port 37C of the converter 36C is connected to the charge port 12C of the portable electric device 10C, the data port 12E of the portable electric device 10C can also be connected to the data port 37E. This permits information stored in the portable electric device 10C and the data processor 10D to be interchanged through the data port 37E, the transmission port 42A of the converter 36C, the bus 40, and the transmission port 42B of the data processor 10D.

In contrast to the prior art, a user can arbitrarily choose different power supplies for charging different portable electric devices since the different power supplies only need to match up with a corresponding transformer and the different portable electric devices only need match up with a corresponding converter. Furthermore, when the present invention portable electric device is charged, the portable electric device can simultaneously interchange information with another data processor.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A power charge system for charging a plurality of portable electric devices, each portable electric device comprising a charge port for receiving an operating voltage of the portable electric device, operating voltages of different portable electric devices being different, the power charge system comprising:

a plurality of transformers for converting a plurality of different input voltages into a direct current (DC) standard voltage, each transformer having an output port for outputting the standard voltage; and a plurality of converters for converting the standard voltage into the operating voltages of the plurality of portable electric devices, each converter having an input port and an output port, the input port of the converter being connected to the output port of the transformer for receiving the standard voltage, the output port of the converter being connected to the charge port of the portable electric device for outputting the operating voltage of the portable electric device;

wherein a portable electric device needs be charged, a converter corresponding to the portable electric device is capable of being electrically connected to any one of the transformers to receive the standard voltage from the transformer so as to charge the portable electric device.

2. The power charge system of claim 1 wherein the converter further comprises:

a data port for accessing data from the charge port of the corresponding portable electric device;

a transmission port electrically connected to the data port for transmitting data from the data port; and a bus electrically connected to the transmission port for transmitting data;

wherein when the converter is connected to the charge port of the portable electric device, the bus is capable of being connected to a data processor, and information stored in the portable electric device and the data processor is capable of being interchanged through the data port, the transmission port and the bus.

3. The power charge system of claim 1 wherein the transformer converts an alternating current (AC) voltage to the standard voltage.

4. The power charge system of claim 1 wherein the portable electric device is a notebook.

5. The power charge system of claim 1 wherein the portable electric device is a cellular phone.

6. The power charge system of claim 1 wherein the portable electric device is a personal data assistant.

7. A converter for a power charge system, the power charge system being used for charging a portable electric device using different types of power supplies, the portable electric device having a charge port for inputting an operating voltage of the portable electric device, the power charge system comprising:

a plurality types of transformers for transforming different input voltages into a direct current (DC) standard voltage, each transformer having an output port for outputting the standard voltage;

the converter being used for converting the standard voltage into the operating voltage of the portable electric device, the converter having an input port and an output port, the input port of the converter being connected to the output port of the transformer for receiving the standard voltage, the output port of the converter being connected to the charge port of the portable electric device for outputting the operating voltage of the portable electric device;

wherein when the portable electric device needs be charged, the converter is capable of being electrically connected to any one of the transformers to receive the standard voltage from the transformer so as to charge the portable electric device.

8. The converter of claim 7 further comprising:

a data port for accessing data from the charge port of the portable electric device;

a transmission port electrically connected to the data port for transmitting data from the data port; and a bus electrically connected to the transmission port for transmitting data;

wherein when the converter is connected to the charge port of the portable electric device, the bus is capable of being connected to a data processor, and information stored in the portable electric device and the data processor is capable of being interchanged through the data port, the transmission port and the bus.

9. The converter of claim 7 wherein the transformer converts an alternating current (AC) voltage to the standard voltage.

10. The converter of claim 7 wherein the portable electric device is a notebook.

11. The converter of claim 7 wherein the portable electric device is a cellular phone.

12. The converter of claim 7 wherein the portable electric device is a personal data assistant.

* * * * *